(12) United States Patent
Lin et al.

(10) Patent No.: US 10,222,024 B2
(45) Date of Patent: Mar. 5, 2019

(54) LENS FOR LIGHT EMITTING DEVICE

(71) Applicant: ADVANCED OPTOELECTRONIC TECHNOLOGY, INC., Hsinchu Hsien (TW)

(72) Inventors: Hsin-Chiang Lin, Hsinchu (TW); Lung-Hsin Chen, Hsinchu (TW); Wen-Liang Tseng, Hsinchu (TW)

(73) Assignee: ADVANCED OPTOELECTRONIC TECHNOLOGY, INC., Hsinchu Hsien (TW)

( * ) Notice: Subject to any disclaimer, the term of this patent is extended or adjusted under 35 U.S.C. 154(b) by 80 days.

(21) Appl. No.: 15/096,277

(22) Filed: Apr. 12, 2016

(65) Prior Publication Data

US 2016/0356451 A1 Dec. 8, 2016

Related U.S. Application Data

(60) Provisional application No. 62/170,143, filed on Jun. 3, 2015.

(51) Int. Cl.
*F21V 5/04* (2006.01)
*G02B 19/00* (2006.01)
*F21Y 115/10* (2016.01)

(52) U.S. Cl.
CPC ............ *F21V 5/04* (2013.01); *G02B 19/0014* (2013.01); *G02B 19/0061* (2013.01); *F21Y 2115/10* (2016.08)

(58) Field of Classification Search
CPC ... F21V 5/04; F21V 5/00; F21V 5/048; F21V 17/101; F21V 5/046; G02B 19/0014; G02B 19/0061
See application file for complete search history.

(56) References Cited

U.S. PATENT DOCUMENTS

| | | | | |
|---|---|---|---|---|
| 8,545,058 B2 * | 10/2013 | Chen et al. | ............... | F21V 5/04 362/311.06 |
| 2010/0328941 A1 * | 12/2010 | Zhang | ...................... | F21V 5/04 362/311.02 |

(Continued)

FOREIGN PATENT DOCUMENTS

| CN | 102748704 A | 10/2012 |
|---|---|---|
| CN | 202613315 U | 12/2012 |

(Continued)

*Primary Examiner* — Y M. Lee
(74) *Attorney, Agent, or Firm* — ScienBiziP, P.C.

(57) ABSTRACT

A light emitting device includes a light source and a lens. The lens includes a light emitting surface, a top surface, four edge surfaces, and a bottom surface. The light emitting surface includes a central recess and two convex regions connecting the central recess at opposite sides. The light emitting surface is symmetrical about the central recess. The lens further defines a receiving space in the bottom surface and four positioning pins on the bottom surface. The receiving space includes a light incident surface. The two convex regions of the light emitting surface and the light incident surface are non-spherical surfaces. A maximum distance, $d_n$, between the light source and the light incident surface is larger than a maximum distance, $D_m$, between the light incident surface and the light emitting surface. The light emitting device provides a wide-angle light distribution.

15 Claims, 7 Drawing Sheets

(56) References Cited

U.S. PATENT DOCUMENTS

2011/0121341 A1* 5/2011 Lee .................... G02B 19/0014
257/98
2015/0369454 A1* 12/2015 Lee ........................ F21V 5/005
362/97.1

FOREIGN PATENT DOCUMENTS

| TW | 352000 M | 3/2009 |
| TW | 392357 M | 11/2010 |
| TW | 461009 M | 9/2013 |

* cited by examiner

LENS FOR LIGHT EMITTING DEVICE

FIELD

The subject matter herein generally relates to light emitting devices, and particularly to a lens for a light emitting device.

BACKGROUND

Light emitting devices are used in car headlights, general lighting, and street lighting. The light emitting device needs a lens to expand light for a wide-angle light distribution.

BRIEF DESCRIPTION OF THE DRAWING

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series, and the like.

A light emitting device comprising a lens and a light source is herein described. The disclosure is illustrated by way of example and not by way of limitation in the accompanying drawings. It should be noted that references to "an" or "one" embodiment in this disclosure are not necessarily to the same embodiment, and such references mean "at least one."

A lens can comprise a light emitting surface, a top surface, four edge surfaces, and a bottom surface. The light emitting surface comprises two convex regions and a central recess. The light emitting surface is a symmetrical structure with respect to the central recess, and the two convex regions connect the central recess at opposite sides. The lens further defines a receiving space in the bottom surface and four positioning pins on the bottom surface. The receiving space includes a light incident surface. The lens has a length of $L_1$ and a width of $L_2$, where $L_1$ is larger than $L_2$. The receiving space has a diameter of $D_0$. The light incident surface is substantially elliptical and has a projecting length $D_1$ and a projecting width $D_2$ as the light incident surface is projected on the bottom surface by a light transmission path parallel to an optical axis O'' which is normal to the bottom surface. The direction of $D_1$ is parallel to the lengthways direction of the lens and the direction of $D_2$ is parallel to the widthways direction of the lens, where $D_2$ is larger than $D_1$. The two convex regions of the light emitting surface and the light incident surface are non-spherical surfaces. The distance between a point Q of the light incident surface and a point P of the light emitting surface is $D_{pq}$, and the maximum value of $D_{pq}$ is $D_m$, being the distance between a point P' of the light emitting surface and a point Q' of the light incident surface. The distance between the central point O of a light source and a point $A_i$ of the light incident surface, with a light incident angle of $\theta_i$, is $d_i$. The light incident angle of $\theta_i$ is defined as the angle between the transmission path of the incident light and the optical axis O''. The maximum value of $d_i$ is $d_n$, which is the distance between the central point $A_n$ of the light incident surface and the central point O of the light source. The lens has a maximum value of $D_{pq}$ larger than the maximum value of $d_i$ to extend the light distribution. Therefore, $D_m$ is larger than $d_n$. In addition, a radius of curvature for a point P of the convex region on the light emitting surface is $R_P$ and a radius of curvature for a point $A_i$ of the light incident surface is $r_i$. The value of $r_i$ is increased as point $A_i$ of the incident surface goes away from the optical axis O''. The minimum radius of curvature for the point $P_m$ of the convex region of the light emitting surface is $R_m$, and the minimum radius of curvature for the point $A_n$ of the light incident surface is $r_n$, where $R_m$ is larger than $r_n$.

A light emitting device as described above can comprise a light emitting diode and a lens.

Figure 1:
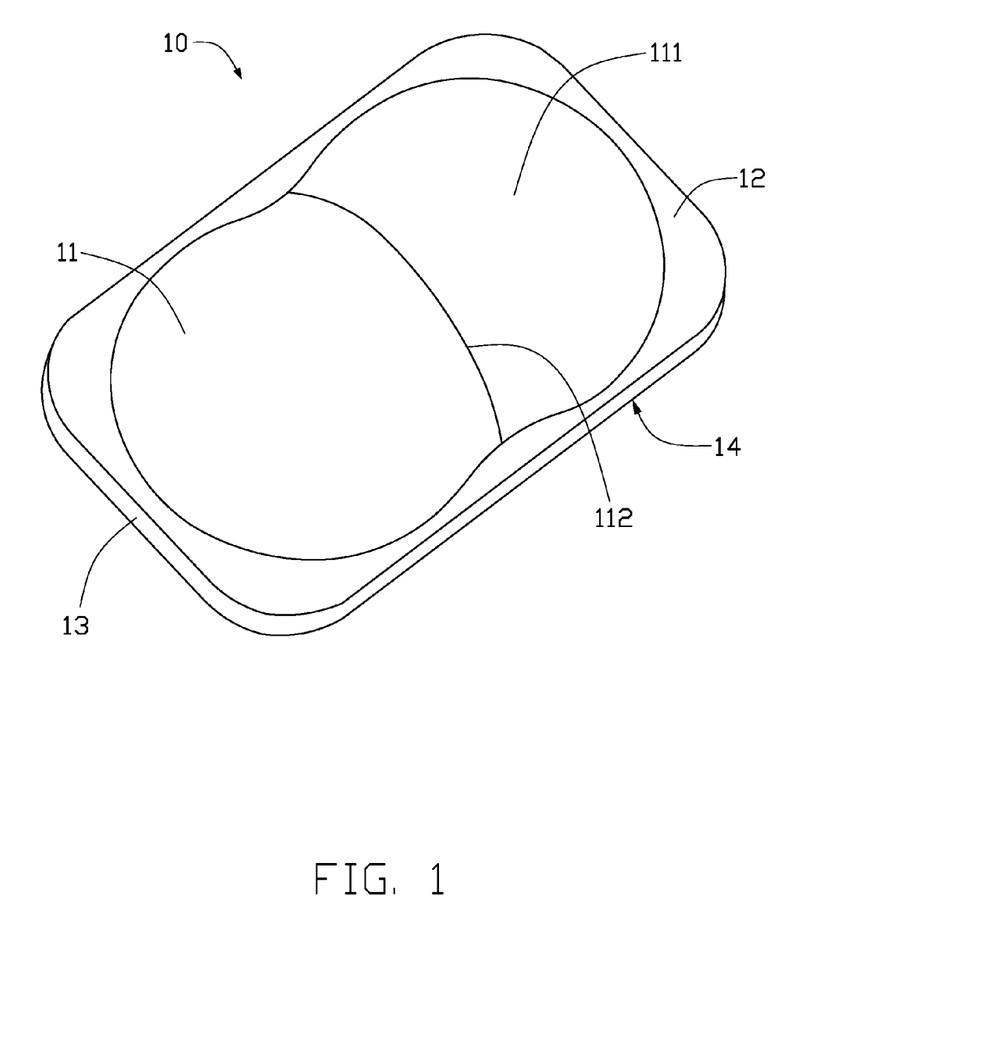
FIG. 1 is an isometric view of a lens structure according to an embodiment of the present disclosure.
Figure 2A:
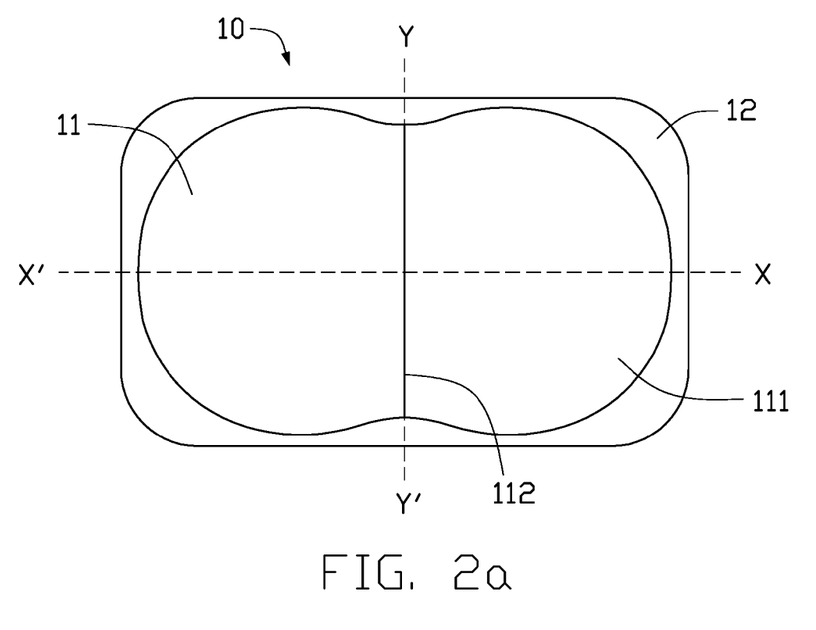
FIG. 2a is a top view of lens structure of FIG. 1 according to the present disclosure.
Figure 2B:
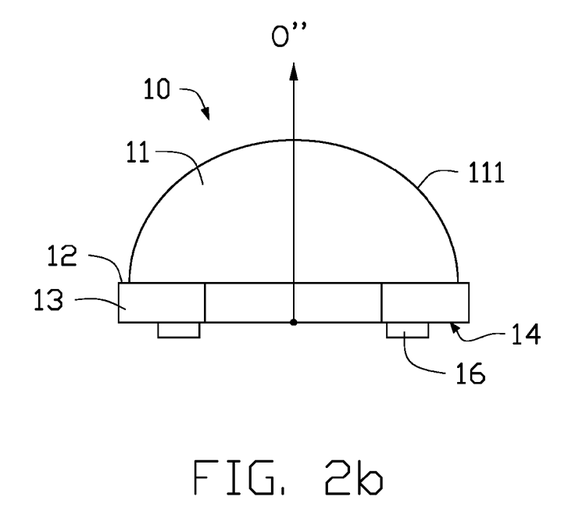
FIG. 2b is a left side view of lens structure of FIG. 1 according to the present disclosure.
Figure 2C:
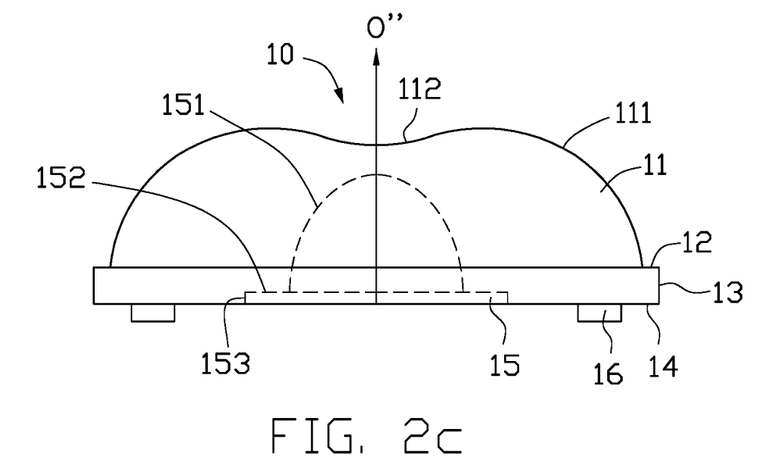
FIG. 2c is a front view of lens structure of FIG. 1 according to the present disclosure.
Figure 2D:
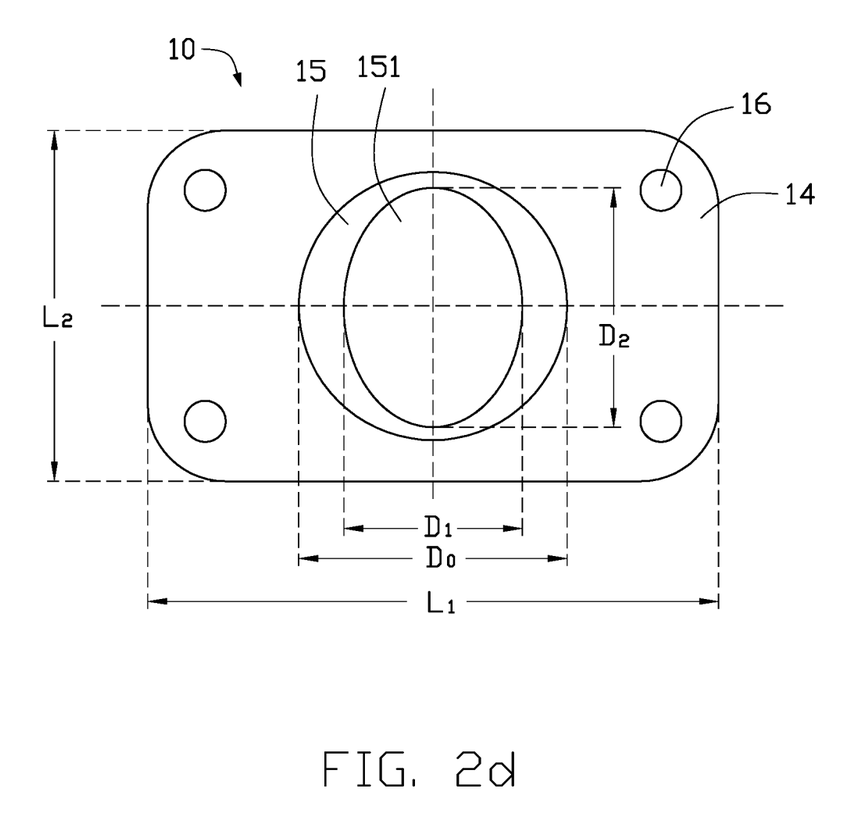
FIG. 2d is a bottom view of lens structure of FIG. 1 according to the present disclosure.

FIG. 1 illustrates a lens 10 comprising a light emitting surface 11, a top surface 12, four side surfaces 13, and a bottom surface 14. The light emitting surface 11 redirects the directions of the output light. The light emitting surface 11 comprises two convex regions 111 and a central recess 112. The light emitting surface 11 is a symmetrical structure with respect to the central recess 112, and the two convex regions 111 connect the central recess 112 at the opposite sides.

FIGS. 2a-2d illustrate the lens 10 further including a receiving space 15 defined in the bottom surface 14 and four positioning pins 16 disposed on the bottom surface 14. The receiving space 15 includes a light incident surface 151, a light source positioning surface 152, and a connecting surface 153 connecting the light source positioning surface 152 with the bottom surface 14. The lens 10 has a length of $L_1$ and a width of $L_2$, where $L_1$ is larger than $L_2$. The receiving space 15 has an opening diameter of $D_0$. The light incident surface 151 has a projecting length $D_1$ and a projecting width $D_2$ as the light incident surface 151 is projected on the bottom surface 14 by a light transmission path parallel to an optical axis O" which is normal to the bottom surface 14. The direction of $D_1$ is parallel to the length direction of the lens and the direction of $D_2$ is parallel to the width direction of the lens, where $D_2$ is larger than $D_1$. In addition, a maximum distance between of the light incident surface 151 and the convex region 111 of the light emitting surface 11 is larger than a normal distance from the central point of the light incident surface 151 to the projection plane of light incident surface 151 on the plane of the light source positioning surface 152 along the optical axis O" perpendicular to the top surface. When light is emitted from the light incident surface 151 of the lens 10, the light is redistributed over a wide angle by the light emitting surface 11 of the lens 10. In at least one embodiment, the receiving space 15 only includes a light incident surface 151 and the light incident surface 151 directly connecting with the bottom surface 14.

Figure 3A:
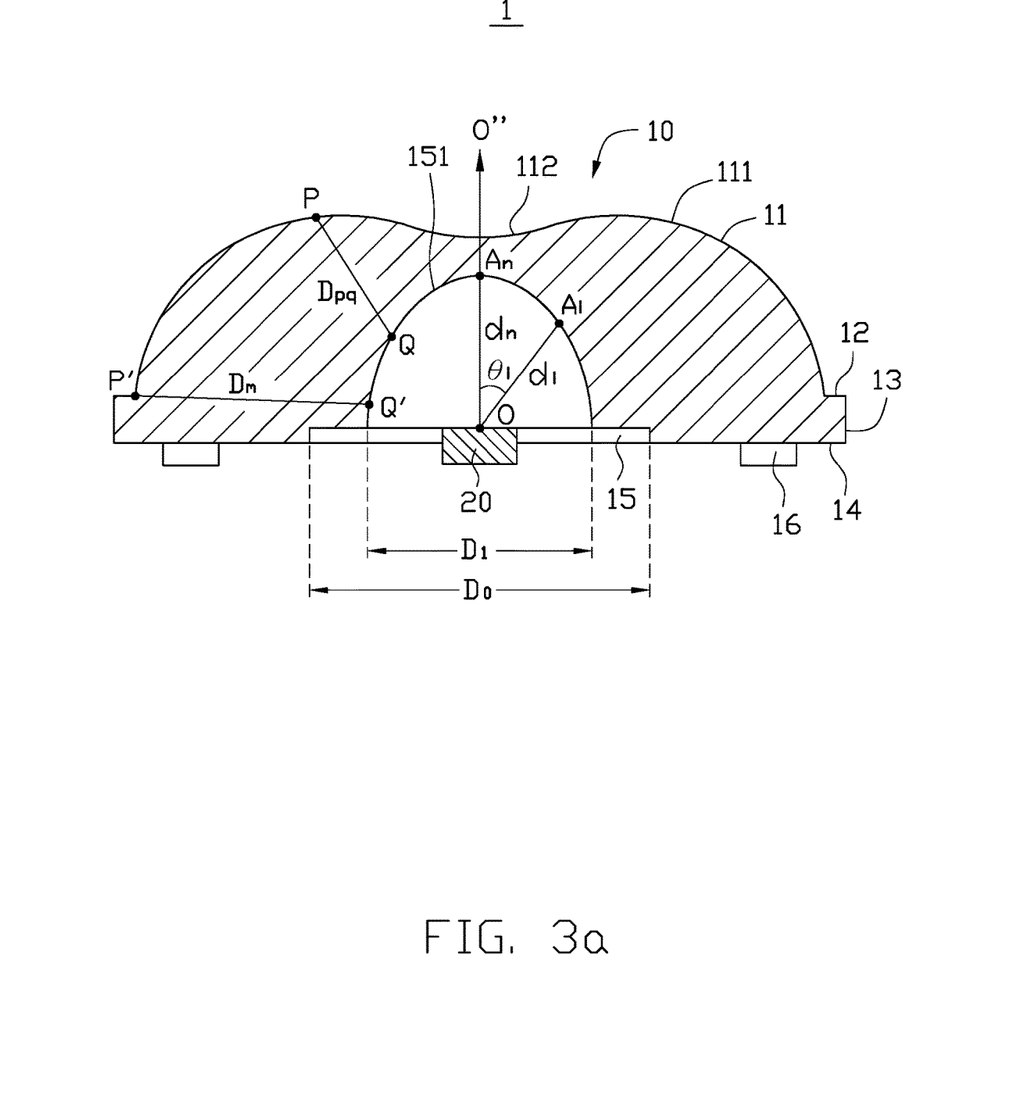
FIG. 3a is a cross-sectional view of lens structure of FIG. 1 with a distance relation between the line segment of PQ and the line segment of $OA_i$ according to the present disclosure.
Figure 3B:
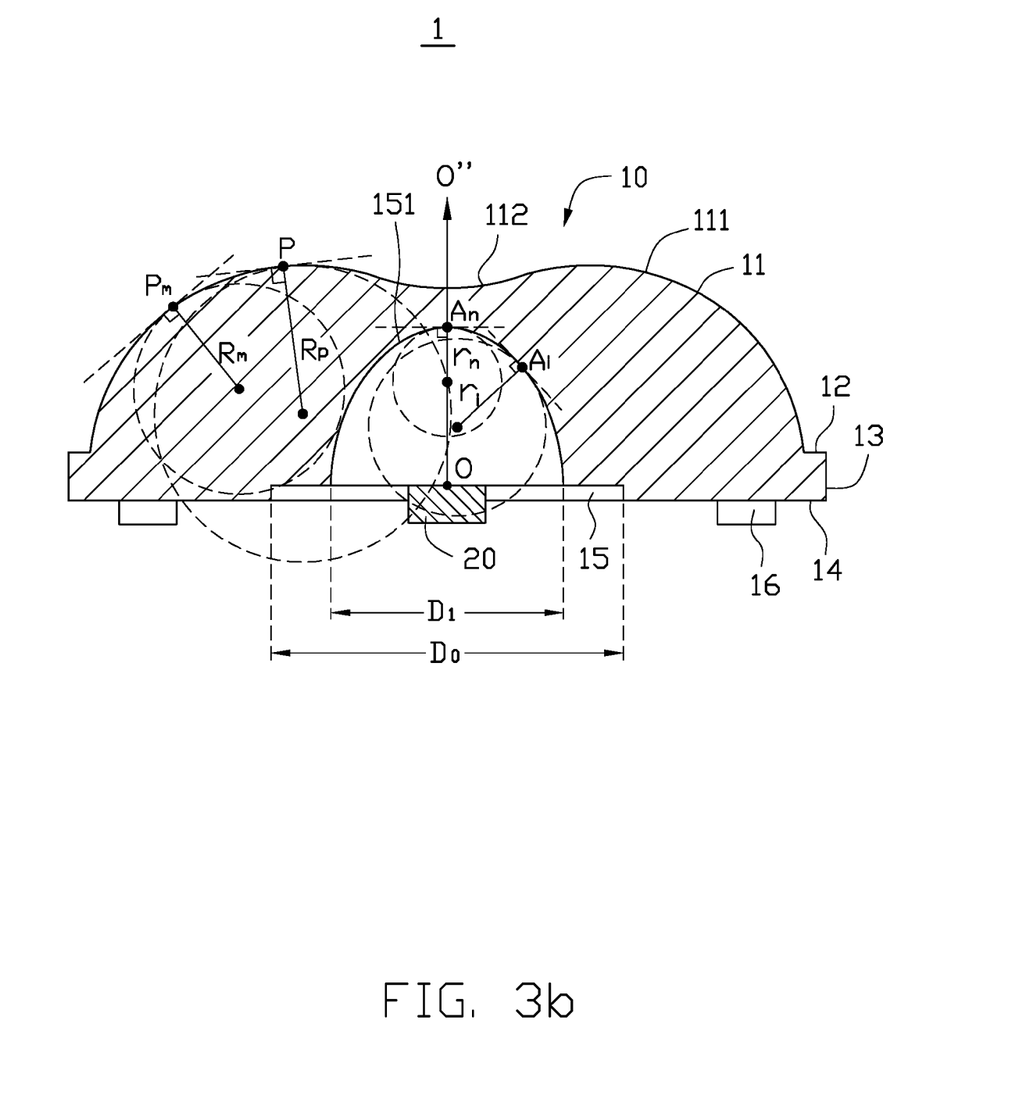
FIG. 3b is a cross-sectional view of lens structure of FIG. 1 with a radius of curvature relation between the points on the light incident surface and the points on the light emitting surface according to the present disclosure.

FIGS. 3a and 3b illustrate the lens 10 and a light source 20. The emitting surface of the light source 20 has a central point O. The two convex regions 111 of the light emitting surface 11 and the light incident surface 151 of the lens 10 are non-spherical surfaces. The distance between a point Q of the light incident surface 151 and a point P of the light emitting surface 11 is $D_{pq}$, and the maximum value of $D_{pq}$ is $D_m$, which is the distance between a point P' of the light emitting surface 11 and a point Q' of the light incident surface 151. The distance between the central point O of a light source 20 and a point $A_i$ of the light incident surface 151 with a light incident angle of $\theta_i$, is $d_i$. The light incident angle $\theta_i$ is defined as the angle between the light transmission path of the incident light and the optical axis O". The maximum value of $d_i$ is $d_n$, being the distance between the central point $A_n$ of the light incident surface 151 and the central point O of the light source 20. In this embodiment, the maximum value of $D_{pq}$ can be obtained, as the point of Q' is located on the point of $A_n$. The lens has a maximum value of $D_{pq}$ larger than the maximum value of $d_i$ to extend the light distribution. Therefore, $D_m$ is larger than $d_n$.

Referring specifically to FIG. 3b, a radius of curvature for a point P of the convex region 111 on the light emitting surface 11 is $R_P$ and a radius of curvature for a point $A_i$ of the light incident surface 151 is $r_i$. Due to the ellipsoid shape of surface 151, the radius of curvature $r_i$ will be smaller when Ai is closer to the optical axis O", and lager when Ai is further away from the optical axis. The minimum radius of curvature for the point $P_m$ of the convex region 111 of the light emitting surface 11 is $R_m$, and the minimum radius of curvature for the point $A_n$ of the light incident surface 151 is $r_n$, where $R_m$ is larger than $r_n$.

FIGS. 3a and 3b also show a light emitting device 1 comprising the lens 10 and the light source 20. The light source 20 of a light emitting device 1 can be a light emitting diode, a laser diode, or a point light source.

The lens 10 of light emitting device 1 comprises a light emitting surface 11, a top surface 12, four side surfaces 13, and a bottom surface 14. The light emitting surface 11 redirects the direction of emitted light. The light emitting surface 11 comprises two convex regions 111 and a central recess 112. The light emitting surface 11 is a symmetrical structure respective to the central recess 112, and the two convex regions 111 connect to the central recess 112 at opposite sides. The lens 10 further defines a receiving space 15 in the bottom surface 14 and four positioning pins 16 on the bottom surface 14. The receiving space 15 includes a light incident surface 151.

The lens 10 has a length of $L_1$ and a width of $L_2$, where $L_1$ is larger than $L_2$. The receiving space 15 has an opening diameter of $D_0$. The light incident surface 151 has a projecting length $D_1$ and a projecting width $D_2$ as the incident surface is projected on the bottom surface 14 by a light transmission path parallel to the optical axis O" which is normal to the bottom surface 14. The direction of $D_1$ is parallel to the length direction of the lens and the direction of $D_2$ is parallel to the width direction of the lens, where $D_2$ is larger than $D_1$.

The distance between a point Q of the light incident surface 151 and a point P of the light emitting surface 11 is $D_{pq}$, and the maximum value of $D_{pq}$ is $D_m$, which is the distance between a point P' of the light emitting surface 11 and a point Q' of the light incident surface 151. The distance between the central point O of a light source 20 and a point $A_i$ of the light incident surface 151 with a light incident angle of $\theta_i$ is $d_i$. The light incident angle $\theta_i$ is defined as the angle between the light transmission path of the incident light and the optical axis O". The maximum value of $d_i$ is $d_n$, which is the distance between the central point $A_n$ of the light incident surface 151 and the central point O of the light source 20. In this embodiment, the maximum value of $D_{pq}$ can be obtained as the point of Q' is located on the point of $A_n$. The lens has a maximum value of $D_{pq}$ larger than the maximum value of $d_i$ to extend the light distribution. Therefore, $D_m$ is larger than $d_n$.

The two convex regions 111 of the light emitting surface 11 and the light incident surface 151 of the lens 10 are non-spherical surfaces. The radius of curvature for a point P of the convex region 111 on the light emitting surface 11 is $R_P$ and the radius of curvature for a point $A_i$ of the light incident surface 151 is $r_i$. The value of $r_i$ increases as the point $A_i$ of the incident surface 151 goes away from the optical axis O". The minimum radius of curvature for the point $P_m$ of the convex region 111 of the light emitting surface 11 is $R_m$, and the minimum radius of curvature for the point $A_n$ of the light incident surface 151 is $r_n$, where $R_m$ is larger than $r_n$.

The lens 10 can be molded to or attached with the light source 20. The light emitting device 1 can further include a substrate to carry the light source 20 and the lens 10.

Figure 4:
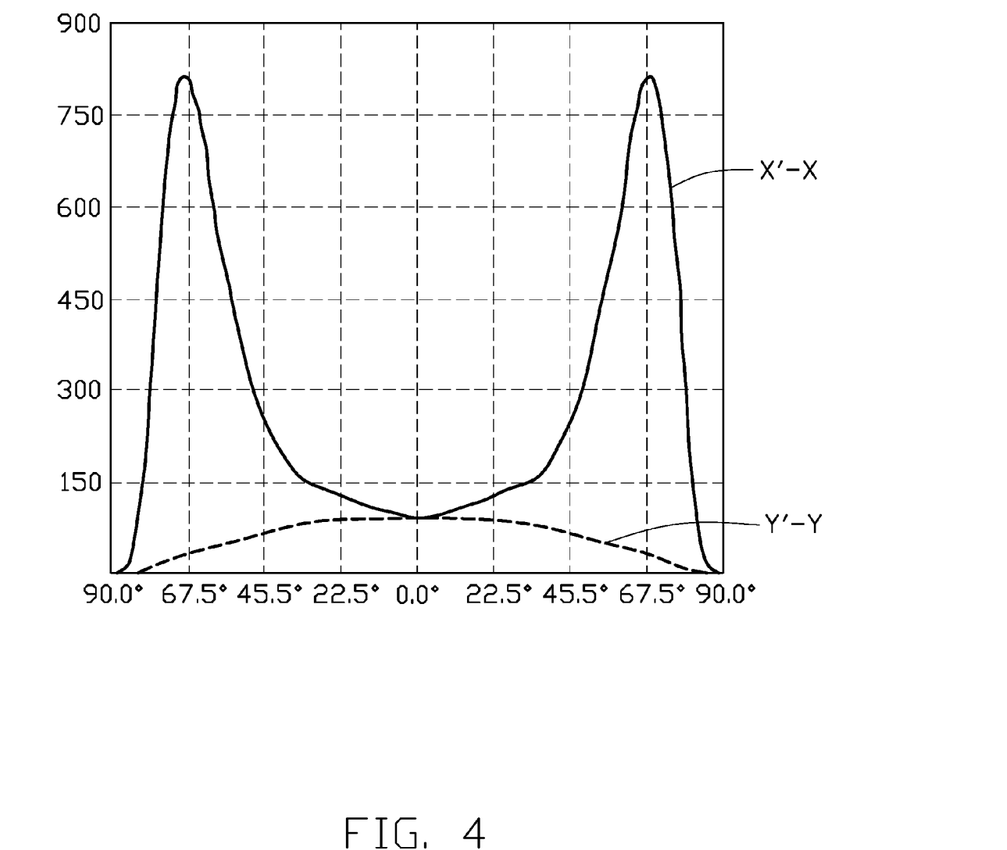
FIG. 4 is a light distribution graph of a light emitting diode with the lens structure of FIG. 1 according to the present disclosure, along the lines of X'-X and Y'-Y of FIG. 2.
Figure 5:
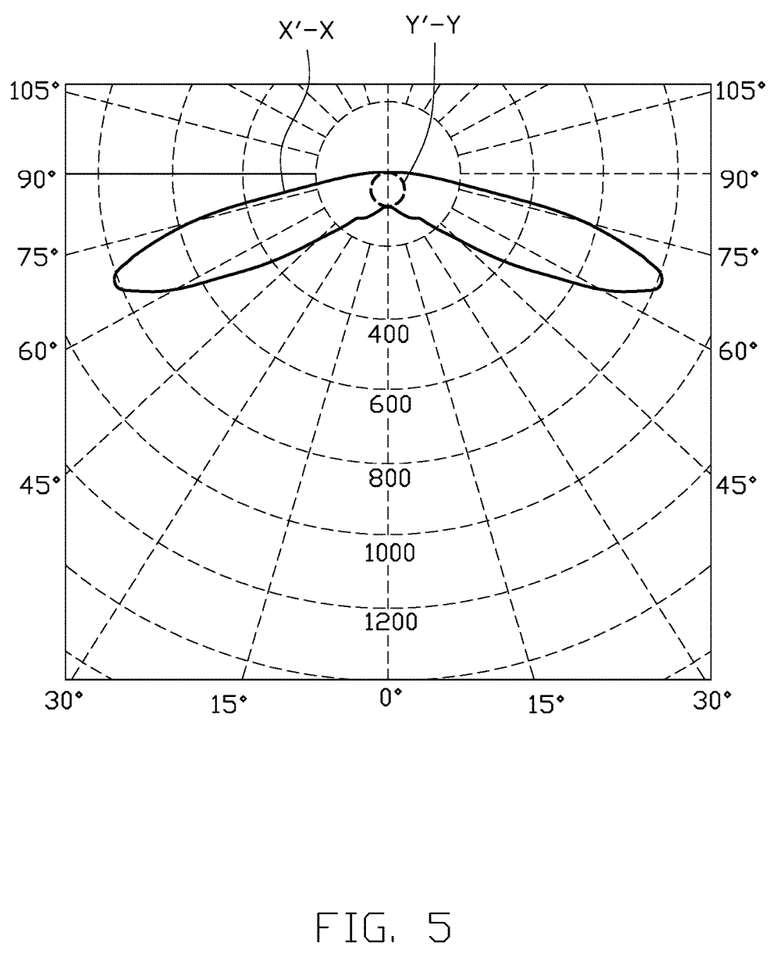
FIG. 5 is an angular light distribution graph of the light emitting device with lens structure of FIG. 1 according to the present disclosure, along the lines of X'-X and Y'-Y of FIG. 2.

FIG. 4 and FIG. 5 illustrate a light distribution graph of the light emitting device 1. The light distribution graph of the light emitting device 1 has a batwing distribution along a line X'-X of FIG. 2. The maximum peak light intensity is at a light incident angle of 68 degrees along the line of X'-X of FIG. 2, and may in general peak between 60-80 degrees, preferably between 65-70 degrees. The light distribution of the light emitting device 1 is a Lambertian distribution along a line Y'-Y of FIG. 2. The maximum peak light intensity is at a light incident angle of 0 degrees along the line Y'-Y of FIG. 2. Therefore, the light emitting device 1 has a wide-angle light distribution along the line X'-X to provide a re-directional and wide-angle light distribution for different applications.

The embodiments shown and described above are only examples. Many details are often found in the art such as the other features of a light emitting device and a lens. Therefore, many such details are neither shown nor described. Even though numerous characteristics and advantages of the present technology have been set forth in the foregoing description, together with details of the structure and function of the present disclosure, the disclosure is illustrative only, and changes can be made in the details, especially in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A light emitting device comprising:
   a light source comprises an emitting surface with a central point; and
   a lens comprising
      a light emitting surface comprising a central recess and two convex regions smoothly connecting the central recess at the opposite sides;
      at least one side surface;
      a top surface connecting the two convex regions and the at least one side surface, the top surface has a length of L1 and a width of L2, wherein the value of L1 is larger than the value of L2; and
      a bottom surface comprises a receiving space with an opening diameter of D0, the receiving space comprises a light incident surface, a light source positioning surface, and a connecting surface connecting the light source positioning surface with the bottom surface, the light source is positioned at the light source positioning surface to cause the emitting surface of the light source to be coplanar with the light source positioning surface, the center point of the emitting surface is aligned with a center point of the light incident surface, the light incident surface has a projecting length of D1 and a projecting width of D2 as the light incident surface is projected on the bottom surface with a straight light parallel to an optical axis perpendicular to the-bottom surface, wherein the projecting length of D1 and the projecting width of D2 are respectively parallel to the directions of L1 and L2, and the value of D1 is smaller than the value of D2.

2. The light emitting device of claim 1, wherein the two convex regions of the light emitting surface are non-spherical surfaces.

3. The light emitting device of claim 1, wherein the light incident surface is a non-spherical surface.

4. The light emitting device of claim 1, wherein a maximum distance between of the light incident surface and the convex region of the light emitting surface is larger than the distance between the central point of the light incident surface and the central point of the emitting surface of the light source.

5. The light emitting device of claim 1, wherein a minimum radius of curvature for the convex region of the light emitting surface is larger than a minimum radius of curvature of the light incident surface.

6. A light emitting device comprising:
   a light source comprises an emitting surface with a central point; and
   a lens comprising
      a light emitting surface comprising a central recess and two convex regions smoothly connecting the central recess at the opposite sides;
      at least one side surface;
      a top surface connecting the two convex regions and the at least one side surface, the top surface has a length of L1 and a width of L2, wherein the value of L1 is larger than the value of L2; and
      a bottom surface comprises a receiving space with an opening diameter of D0, the receiving space comprises a light incident surface, a light source positioning surface, and a connecting surface connecting the light source positioning surface with the bottom surface, the light source is positioned at the light source positioning surface to cause the emitting surface of the light source to be coplanar with the light source positioning surface, the center point of the emitting surface is aligned with a center point of the light incident surface, the light incident surface has a projecting length of D1 and a projecting width of D2 as the light incident surface is projected on the bottom surface with a straight light parallel to an optical axis perpendicular to the bottom surface, wherein the projecting length of D1 and the projecting width of D2 are respectively parallel to the directions of L1 and L2, and the value of D1 is smaller than the value of D2,
   wherein a minimum radius of curvature for the convex region of the light emitting surface is larger than a minimum radius of curvature of the light incident surface.

7. The light emitting device of claim 6, wherein the two convex regions of the light emitting surface are non-spherical surfaces.

8. The light emitting device of claim 6, wherein the light incident surface is a non-spherical surface.

9. The light emitting device of claim 6, wherein a maximum distance between of the light incident surface and the convex region of the light emitting surface is larger than the distance between the central point of the light incident surface and the central point of the emitting surface of the light source.

10. The light emitting device of claim 6, wherein the light source is selected from a group of a light emitting diode, a light emitting diode, or a point light source.

11. The light emitting device of claim 6, wherein the light emitting device further comprises a substrate to carry the light source and the lens.

12. The light emitting device of claim 6, wherein the lens is attached to the light source.

13. The light emitting device of claim 6, wherein the lens is molded with the light source.

14. The light emitting device of claim 6, wherein the light emitting device has a batwing light distribution along the direction of L1.

15. The light emitting device of claim 14, wherein a peak intensity of the batwing light distribution for the light emitting device is around 60-80 degrees.

* * * * *